United States Patent
Aggarwal et al.

(10) Patent No.: US 7,424,488 B2
(45) Date of Patent: Sep. 9, 2008

(54) CONTEXT-AWARE, ADAPTIVE APPROACH TO INFORMATION SELECTION FOR INTERACTIVE INFORMATION ANALYSIS

(75) Inventors: Vikram Aggarwal, Yorktown Heights, NY (US); Zhen Wen, Chappaqua, NY (US); Michelle X. Zhou, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 11/475,773

(22) Filed: Jun. 27, 2006

(65) Prior Publication Data

US 2007/0299862 A1  Dec. 27, 2007

(51) Int. Cl.
*G06F 7/00* (2006.01)
*G06F 17/30* (2006.01)
*G06F 17/00* (2006.01)

(52) U.S. Cl. .......................................... 707/102; 707/5
(58) Field of Classification Search ......... 707/100–102, 707/3–5; 706/20–21
See application file for complete search history.

(56) References Cited

U.S. PATENT DOCUMENTS

| 6,070,176 | A | 5/2000 | Downs et al. |
| 6,556,983 | B1* | 4/2003 | Altschuler et al. ............ 706/55 |
| 2003/0233362 | A1 | 12/2003 | Nolan et al. |
| 2005/0144158 | A1 | 6/2005 | Nolan et al. |
| 2005/0154716 | A1 | 7/2005 | Watson et al. |
| 2005/0210024 | A1* | 9/2005 | Hurst-Hiller et al. ........... 707/5 |
| 2006/0026147 | A1 | 2/2006 | Cone et al. |
| 2006/0106793 | A1* | 5/2006 | Liang ............................ 707/5 |

OTHER PUBLICATIONS

Budzik et al., "Watson: anticipating and contextualizing Information Needs,"Proceedings of the Sixty-Second Annual Meeting of the American Society of Information Science, 1999.*
J. TeeVan et al., "personalizing search via Automated Analysis of Interests and activities," SIGIR '05, 8 pages, Aug. 2005.*
Krishna Bharat, "SearchPad: Explicit Capture of Search Context to Support Web Search," In WWW 2000, pp. 1-11, 2000, (no day, month).
R. Kraft et al., "Y!Q:Contextual Search at the Point of Inspiration," In CIKM '05, pp. 816-823, Oct. 31-Nov. 5, 2005.
X. Shen et al., "Context-Sensitive Information Retrieval Using Implicit Feedback," In SIGIR '05, 8 pages, Aug. 2005, (no day).

(Continued)

*Primary Examiner*—Hung T Vy
(74) *Attorney, Agent, or Firm*—Lisa M. Yamonaco; Ryan, Mason & Lewis, LLP (57) ABSTRACT

Improved information analysis techniques are disclosed. For example, a computer-implemented method of automatically assisting an analyst in a current information analysis task includes the following steps. An analytic context is modeled in a user-system cooperative manner, wherein the analytic context is a structure representative of user analytic actions and relationships associated therewith. At least a portion of the user-system cooperatively-modeled analytic context structure is utilized to adaptively gather information relevant to a current information analysis task.

1 Claim, 11 Drawing Sheets

OTHER PUBLICATIONS

J. Teevan et al., "Personalizing Search via Automated Analysis of Interests and Activities," SIGIR '05, 8 pages, Aug. 2005, (no day, month).

F. Das-Neves et al., "Connecting Topics iin Document Collections with Stepping Stones and Pathways," Conference on Information and Knowledge Management (CIKM), pp. 91-98, Nov. 2005, (no day).

J. Budzuk et al., "Watson: Anticipating and Contextualizing Information Needs," Proceedings of the Sixty-Second Annual Meeting of the American Society for Information Science, 14 pages, 1999, (no day, month).

* cited by examiner

FIG. 1(a)

Luthor Announces Biotech Lab to Locate in Alderwood

Story by: Mel Sacher

Date Published to Web: 02/02/2002

ALDERWOOD – Alderwood Mayor Rex Luthor announced today that a new biotechnology laboratory will be built here that he believes will increase economic property and development in the city, after a long period of financial drought. To coincide with Luthor's announcement, he announced a private investment by the Washen Foundation of $1,000,000 to startup "Boynton Laboratories", to be named after the world-renowned biologist, Dr. Philip Boynton. Dr. Boynton, 85, arrived in Alderwood on Tuesday and stood with Luthor, mayor's aide Laurie Sulfate, council members John Torch, Jennie Angel, and Mayor Pro-tem George Greenway at the press conference in city hall. Luthor also announced $225,000 in matching funds from the state's new biotechnology initiative, and said he is working with the Washington State Legislature to secure an additional $300,000 for the lab, which is set to open this fall.
Boynton, who just retired as the dean of the College of Environment and Life Sciences at USC and himself an investor in the laboratory at a stake of $25,000, said a biotech lab in Washington state made considerable sense. "Washington state has the infrastructure to become the nation's leader in biotechnology with it's wealth of universities, high tech companies, and existing scientific mind-share."
Boynton explained how the laboratory will focus on a problem area of acute interest to Washington state residents – mad cow disease. "Mad Cow Disease is the commonly used name for Bovine Spongiform Encephalopathy, or BSE, a slowly progressive, degenerative, fatal disease affecting the central nervous system of adult cattle. There is a disease similar to BSE call Creutzfeldt–Jacob Disease that is found in people. A variant form of CJD is believe to be cause by eating 1 Luthor Announces Biotech Lab to Locate in Alderwood 04/03/2006

2 Landscaping ordinance OK'd despite opposition 06/15/2003

3 Forum 02/27/2003

4 Court ruling reverses annexation law in state 02/05/2002

5 New home approved for Eighth Street 04/01/2003

6 Setback change approved for Grandview Avenue home 06/25/2003

7 Alderwood Civil Service Commission amends lay-off rules for fire department 07/22/2004

8 Off-premise signs approved on 3-1 vote 06/25/2003 venture capital group known for its forays into high technology wealthy City Attorney Bruce Rinz is heavily vested in this organ

| LAST_NAME | FIRST_NAME | POB | SEX | DOB | PARTY |
|---|---|---|---|---|---|
| FELDHAUS | SCOTT | Alderwood | MALE | 1914-12-21 | DEMOCRAT |
| CHOU | ABIGAIL | Wyoming | FEMALE | 1916-07-22 | DEMOCRAT |
| MATHEWS | CHARLEY | Alderwood | MALE | 1913-12-04 | DEMOCRAT |
| STRICKLAND | SAMUEL | Alderwood | MALE | 1915-11-24 | DEMOCRAT |
| WRIGHT | DOROTHY | Idaho | FEMALE | 1913-10-08 | REPUBLICAN |
| TUCKER | LAUREN | Alderwood | MALE | 1919-02-23 | DEMOCRAT |
| HOFSTAD | HARRY | Alderwood | MALE | 1916-03-23 | DEMOCRAT |
| OLIVAREZ | EARL | Aderwood | MALE | 1918-06-28 | REPUBLICAN |
| LEAUMONT | WILFORD | DELAWARE | MALE | 1918-10-16 | DEMOCRAT |

1 Rapid testing to be used in testing cattle for mad cow 12/31/2003

2 Luthor Announces Biotech Lab to Locate in Alderwood 02/02/2002

3 Boynton Laboratories Press Release 09/15/2002

4 Laboratory Groundbreaking 04/03/2006

5 Synthetic Prion Causes Neurological Disease In Mice 01/20/2004

6 Alderwood Land Grab in the Works? 07/02/2003

Chief Scientist

7 Everson girl spends holiday shadowing Alderwood ER nurses 01/07/2004

8 Von Ryker Institute AG Closed. Swiss officials investigating allegations of bioethics violations and fraud 09/15/2001

Lab Director

9 FDA cancels investigation 06/19/2004

10 FDA starts investigation of Boynton 04/16/2004

11 Alderwood Lab breakthrough in mad cow disease 03/02/2004

12 Tacitly yours 05/10/2002

13 Boynton Labs chosen for national testing 09/13/2003

Spokeswoman

14 Torch scandal? 04/30/2004

| LAST_NAME | FIRST_NAME | POB | SEX | DOB | PARTY |
|---|---|---|---|---|---|
| RINZ | BRUCE | SWITZERLAND | MALE | 1957-01-03 | UNDECLARED |
| FELDHAUS | SCOTT | Alderwood | MALE | 1914-12-21 | DEMOCRAT |
| CHOU | ABIGAIL | Wyoming | FEMALE | 1916-07-22 | DEMOCRAT |
| MATHEWS | CHARLEY | Alderwood | MALE | 1913-12-04 | DEMOCRAT |
| STRICKLAND | SAMUEL | Alderwood | MALE | 1915-11-24 | DEMOCRAT |
| WRIGHT | DOROTHY | Idaho | FEMALE | 1913-10-08 | REPUBLICAN |
| TUCKER | LAUREN | Alderwood | MALE | 1919-02-23 | DEMOCRAT |
| HOFSTAD | HARRY | Alderwood | MALE | 1916-03-23 | DEMOCRAT |
| OLIVAREZ | EARL | Alderwood | MALE | 1918-06-28 | REPUBLICAN |

1 Alderwood Land Grab in the Works? 07/02/2003

2 New Gospel album combines Motown savvy with street ministry jive 02/13/2002

3 Para-educator uses stuffed animals to encourage reading 01/22/2003

Alderwood Land Grab in the Works?

Story by: Mel Sacher

Date Published to Web: 07/02/2003

Don Patino lives in a lot of places, but he didn't think the City of Alderwood was one of them. The retired rancher, car dealer and bank owner splits time among his rural central Washington farm and houses in Idaho and Montana.

But over a five-month span, Parker sees 4,151 neighboring acres to the south from Port Park and 5,024 neighboring acres to the north past Boynton Labs annexed into Alderwood, leaving him adjacent to a land grab that would grow the city considerably.

Although Patino and other rural homeowners would remain residents of Alderwood county on the tax rolls, the inhabitants of up to 16,336 ...mes that could be built around him would all be city residents and eligible for services such as trash and recycling pickup, ...than views dominated by grasses, cows, and trees, Patino might soon look out on concentrations of townhomes, condos, offices ...refronts.

...ne says (not in my back yard), but that's not the issue," said Patino, who grimaced when discussing the number of homes planned ...community docks slated for the Alderwood River near is home.

...art talking bout 2,500 lots with access to the River -- c'mon," he said, chomping on a stubby cigar.

...exation bug is sweeping through western Alderwood County as municipalities stretch, swell and sprawl across the county to ...new land when willing owners ask for inclusion and rezoning -- often when they are preparing property for sale to a developer.

...tom line is municipal leaders expect a flood of new homes and scores of new residents interested in waterfront living, reminiscent ...days of Alderwood. Unconfirmed rumors suggest Swiss developers have expressed acute interest in the new waterfront.

LAND GRAB

VOTER INFO

VAST Query | Notes | Analysis

Source: Voter Records

Keyword:

☐ Followup Query

| InfoSelection (Action *userAction*, ActionNode *s*, ActionGraph *G*) |
|---|
| 1    if (*s* != null) then |
| 2       retrieve (*s*, *G*, *Engine*)//use search engine to find results |
| 3    return; endif |
| 4    *s* ← new ActionNode (*userAction*) |
| 5    insert *s* in *G* to update *G* |
| 6    retrieve (*s*, *G*, *Engine*)//use search engine to find results |
| 7    Vector *notifyList* ← re-rank(*G*) |
| 8    if (*notifyList* is not empty) then |
| 9    alert(*notifyList*) |
| 10    endif |

FIG. 11

CONTEXT-AWARE, ADAPTIVE APPROACH TO INFORMATION SELECTION FOR INTERACTIVE INFORMATION ANALYSIS

FIELD OF THE INVENTION

The present invention generally relates to information analysis and, more particularly, to techniques for user-system cooperative modeling of an analytic context to adaptively gather information relevant to a current information analysis task of a user.

BACKGROUND OF THE INVENTION

Information analysis is a time-consuming process of searching, evaluating, and transforming massive amounts of raw information into descriptions, hypotheses, and explanations. Given the imperfection of today's information technologies, finding relevant information in an evolving investigation is even more challenging for two main reasons.

First, analysts cannot use today's tools to efficiently find often scattered but related information. This becomes more evident when analysts do not know how to express their precise information interests (e.g., initially they may not know what to look for), or the desired information (e.g., finding suspicious financial transactions) cannot be obtained directly from available data sources.

Consider the investigation of an alleged city election fraud. Following a tip that a high-tech company may be involved, Mia, the analyst, discovers a recent biotech startup called Boynton and an alleged land grab event involving Swiss developers. As the investigation develops, Mia also learns that city attorney Rinz is a Swiss native and often involved in making decisions on city land use. Hoping to link the two events together, Mia would like to find more information on Rinz in the context of Boynton and the land grab discoveries. However, the connections among the three entities, Rinz, Boynton, and land grab, may be indirect. Thus, simply combining all the keywords together, such as "Rinz Boynton Land Grab," may not produce any results.

Since existing information analysis tools typically do not understand and maintain a fine-grained, user context, Mia must manually craft multiple inquiries to find the desired information. For example, she may first search the news reports on "land grab." She then combines "Rinz" with terms found in the reports to search for Rinz. Moreover, she must repeat the process to find out more on Rinz in the context of Boynton.

Second, analysts cannot use today's tools to easily manage their evolving information desires in an investigation. Due to incomplete and inconsistent information, analysts often conduct a non-linear investigation by maintaining multiple investigative threads. In the above example, Mia maintains two threads, one on Boynton and the other on land grab. As the investigation evolves, analysts may want to find information that connects different threads. Assume that Mia discovers that Rinz, who may be involved in the land lab, also heavily invests in a venture capital group that finances Boynton. Based on this lead, Mia wishes to uncover more linkages between Boynton and the alleged land grab. However, no existing tools would automatically retrieve the desired information for Mia.

Moreover, analysts may need to re-evaluate past information in the current context as the investigation evolves (e.g., discovery of new information). For example, initially phone calls from the city hall to the city attorney and Switzerland may appear innocuous. However, after Mia discovers that the alleged land grab may involve both Swiss developers and the city attorney, the relevant phone records may become important clues. Again, no existing tools would automatically re-evaluate previously retrieved information (e.g., the phone records) in the updated context. As a result, users would not be alerted to re-examine the newly surfaced, relevant information.

Accordingly, improved information analysis techniques which overcome the above or other drawbacks are needed.

SUMMARY OF THE INVENTION

Principles of the invention provide improved information analysis techniques. More particularly, such techniques provide for user-system cooperative modeling of an analytic context to adaptively gather information relevant to a current information analysis task of a user.

For example, in one aspect of the invention, a computer-implemented method of automatically assisting an analyst in a current information analysis task includes the following steps. An analytic context is modeled in a user-system cooperative manner, wherein the analytic context is a structure representative of user analytic actions and relationships associated therewith. At least a portion of the user-system cooperatively-modeled analytic context structure is utilized to adaptively gather information relevant to a current information analysis task.

The step of user-system cooperative modeling of an analytic context may further include modeling the analytic context as a graph of user analytic actions.

The step of modeling the analytic context as a graph of user analytic actions may further include the step of modeling a user analytic action for a particular investigative target as a node of the analytic action graph.

The step of modeling a user analytic action for a particular investigative target as a node of the analytic action graph may further include the step of persisting user queries on investigative targets, gathered information and interactions with the results related to information gathering.

The step of modeling the analytic context as a graph of user analytic actions may further include the step of cooperatively modeling the relationships of user analytic actions in accordance with the graph.

The step of cooperatively modeling the relationships of user analytic actions may further include the step of modeling logical relationships between user analytic actions in accordance with the graph.

The step of cooperatively modeling the relationships of user analytic actions may further include the step of modeling relationships between user analytic actions beyond logical relationships via user annotations in accordance with the graph.

The step of modeling the analytic context as a graph of user analytic actions may further comprise generating a user interface that allows the analyst to one of view and modify the analytic action graph during analysis.

The step of adaptively gathering information relevant to a current information analysis task may further include the step of adaptive information selection based on evolving analytic context persisted in the analytic action graph.

The step of adaptive information selection based on evolving analytic context persisted in the analytic action graph may further include the step of evaluating information relevance using a context vector that is extracted from the analytic action graph to represent contextual information of interests for each analytic action.

The step of adaptive information selection based on evolving analytic context persisted in the analytic action graph may further include the step of re-ranking previously persisted information in the analytic action graph when the analytic context evolves so as to identify previous information relevant to current analysis in non-linear investigations.

The step of re-ranking previously persisted information may further include the step of assessing the re-ranking quality and sending appropriate notifications based on the re-ranking quality.

The step of adaptive information selection based on evolving analytic context persisted in the analytic action graph may further include permitting an observer to assess the analytic context for information gathering based on the analytic action graph.

The step of adaptive information selection based on evolving analytic context persisted in the analytic action graph may further include permitting the observer to recommend one or more changes to the analytic action graph to improve information gathering. The observer may be the analyst or a computer program. By way of further example, the observer may be an instructor or experienced information analyst that uses the analytic action graph as a pedagogical tool for education of information gathering.

Advantageously, illustrative principles of the invention provide techniques that work with users cooperatively to help build a rich user analytic context over the course of an investigation. Second, the techniques may adaptively select and evaluate information based on the evolving analytic context. In addition, the techniques may externalize the user analytic context, which allows users to track their information needs and directly update such needs if desired.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Illustrative principles of the invention will be explained below in the context of the information analysis example introduced above (i.e., alleged city election fraud). However, it is to be understood that the present invention is not limited to any particular type of information or any particular information analysis environment. Rather, the invention is more generally applicable to any type of information and any information analysis environment in which it would be desirable to provide improved information seeking and analysis results.

As will be illustratively described herein, principles of the invention exploit a user's analytic context to greatly assist analysts in their information-seeking process. As used herein, the phrase "analytic context" refers to facts, circumstances, setting, or other information that surrounds or defines an analysis task. Analytic context captures the structure of user actions performed over the course of an information search and analysis (i.e., an investigation).

Accordingly, principles of the invention provide an intelligent visual analytic system which supports context-sensitive information analysis. Such an analytic system helps users to find relevant information for interactive information analysis. In particular, principles of the invention provide an adaptive, context-aware approach to information selection. Compared to existing systems, which either are context-insensitive or account for only limited context, principles of the invention provide many advantageous features. For example, some of these features include:

(1) User-system cooperative modeling of analytic context. Automatically building a user's analytic context is difficult for two reasons. First, analysts are often unwilling to do extra work to explain their analytic actions in a machine-understandable form. Second, analytic actions could vary significantly. It is thus difficult to automatically infer the relationships among these actions. Principles of the invention support user-system cooperative modeling of an analytic context. On the one hand, the analytic system automatically logs machine-understandable user activities (e.g., user query) as analytic actions. On the other hand, users can interactively specify or modify an analytic context (e.g., linking two actions). As a result, a user's analytic context is dynamically built by leveraging both machine and user effort. Such a context captures the evolving analytic process, which in turn reflects the user's changing information needs.

(2) Context-aware, adaptive information selection. To exploit a user's analytic context, principles of the invention provide a context-aware, adaptive approach to information selection. The approach can automatically select information in the context of related actions. Moreover, our approach can adaptively re-evaluate past information in a changing context and notify users of the newly surfaced, relevant information.

Figure 1A:
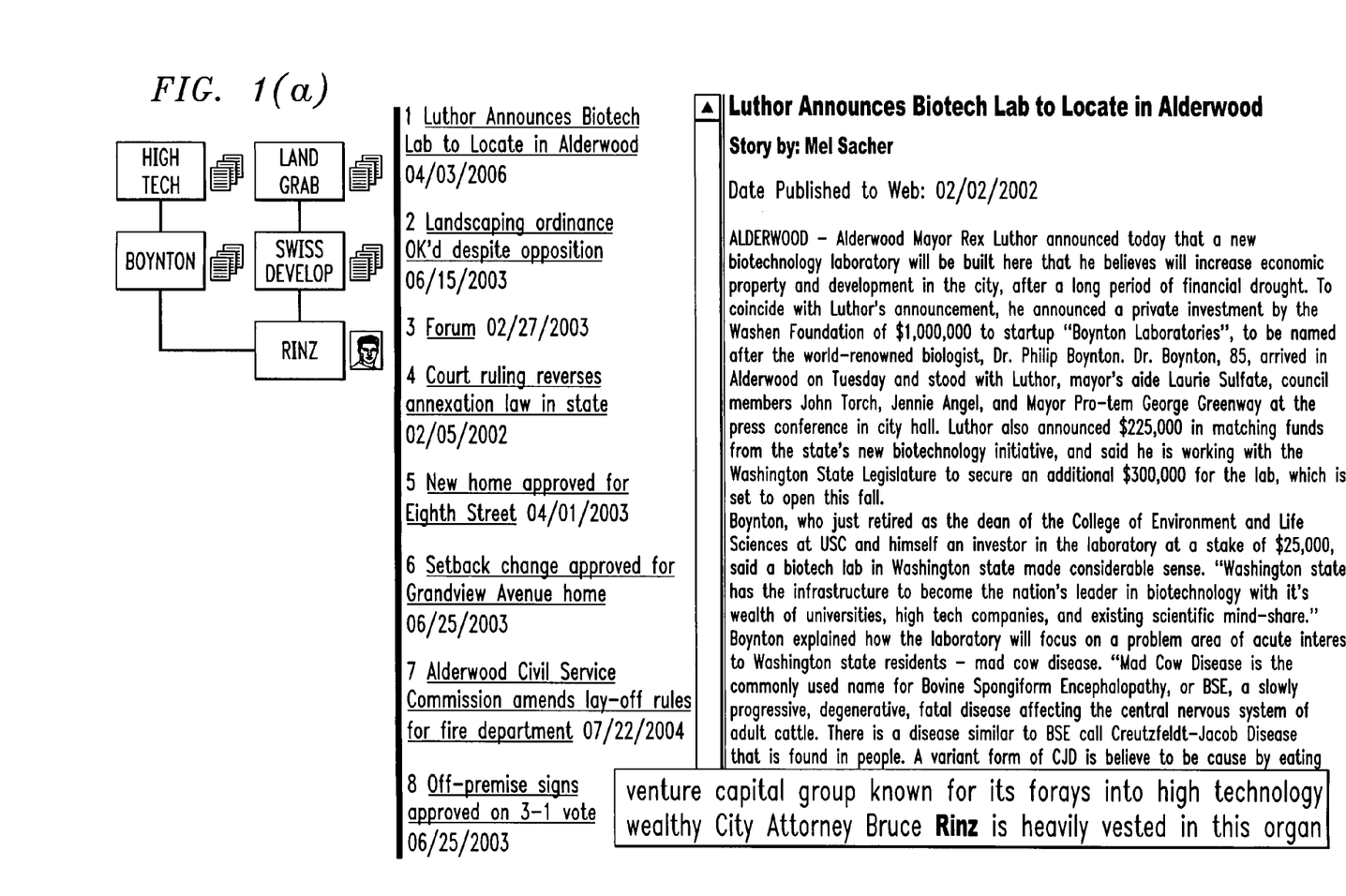
FIGS. 1(a) and 1(b) illustrate exemplary screenshots of an interface of an analytic system, according to an embodiment of the invention.
Figure 1B:
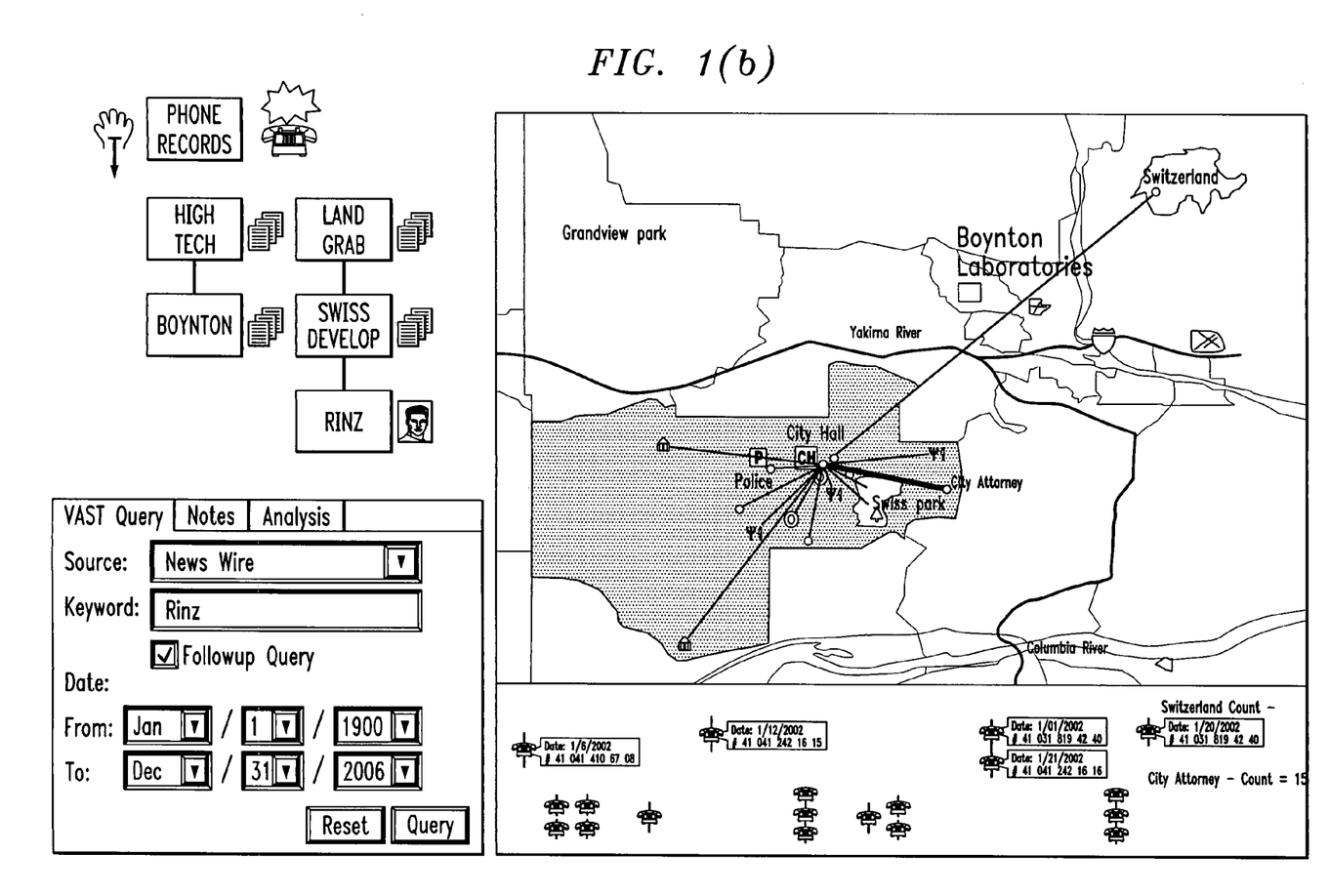

Referring initially to FIG. 1, two illustrative screenshots from the analytic system of the invention are shown. Such screenshots show the investigation of an alleged political fraud (initially described above). FIG. 1(a) displays the information found on a person named Rinz in the current analytic context. FIG. 1(b) highlights and illustrates phone records relevant to the current analytic context. For illustration purpose, we used a desktop magnifier to highlight the relevant information in FIG. 1(a).

Thus, to satisfy Mia's (the analyst's) request in FIG. 1(a), the analytic system of the invention uses the context of Boynton and the land grab to automatically retrieve the desired information on Rinz in one step. As mentioned above, the system can adaptively re-evaluate past information in a changing context and notify users of the newly surfaced, relevant information, e.g., relevant phone records highlighted in FIG. 1(b).

Figure 2:
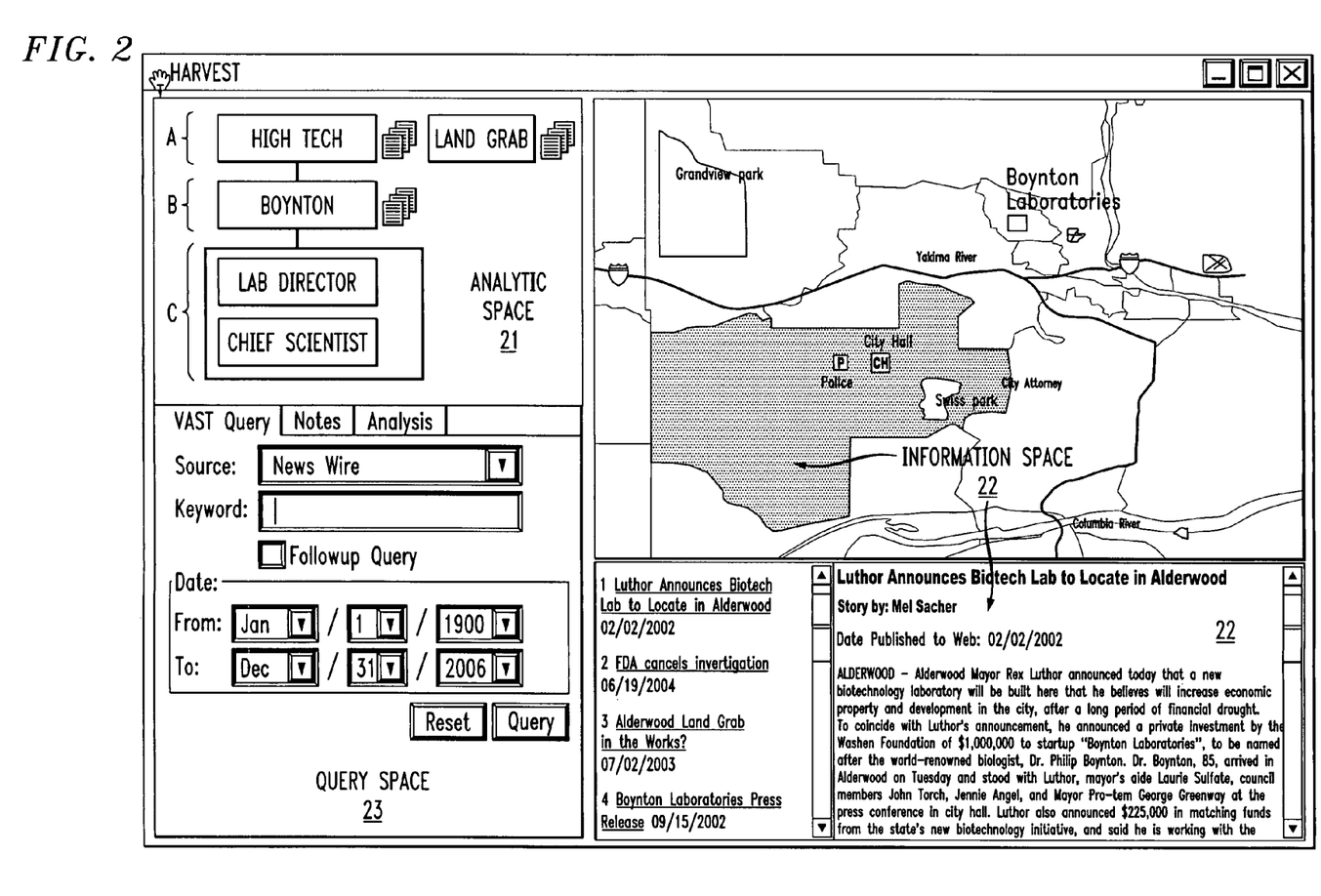
FIG. 2 illustrates an exemplary screenshot of an interface of an analytic system, according to an embodiment of the invention.

First, we describe an illustrative user interface of the analytic system of the invention. FIG. 2 is an annotated snapshot of such an interface. As shown, the analytic system provides users with three main interactive areas: the analytic space 21, the information space 22, and the query space 23.

Analytic space 21 records the evolving analytic threads, consisting of a set of user actions and their relationships. The actions in the analytic space may be in one of the three states: actions already performed (A), actions planned for the future (C), and actions in focus (B). A user can interact with the space to create a new analytic action (e.g., investigating Rinz) or manipulate the existing analytic actions (e.g., connecting the Boynton lab thread with the land grab thread).

Figure 3:
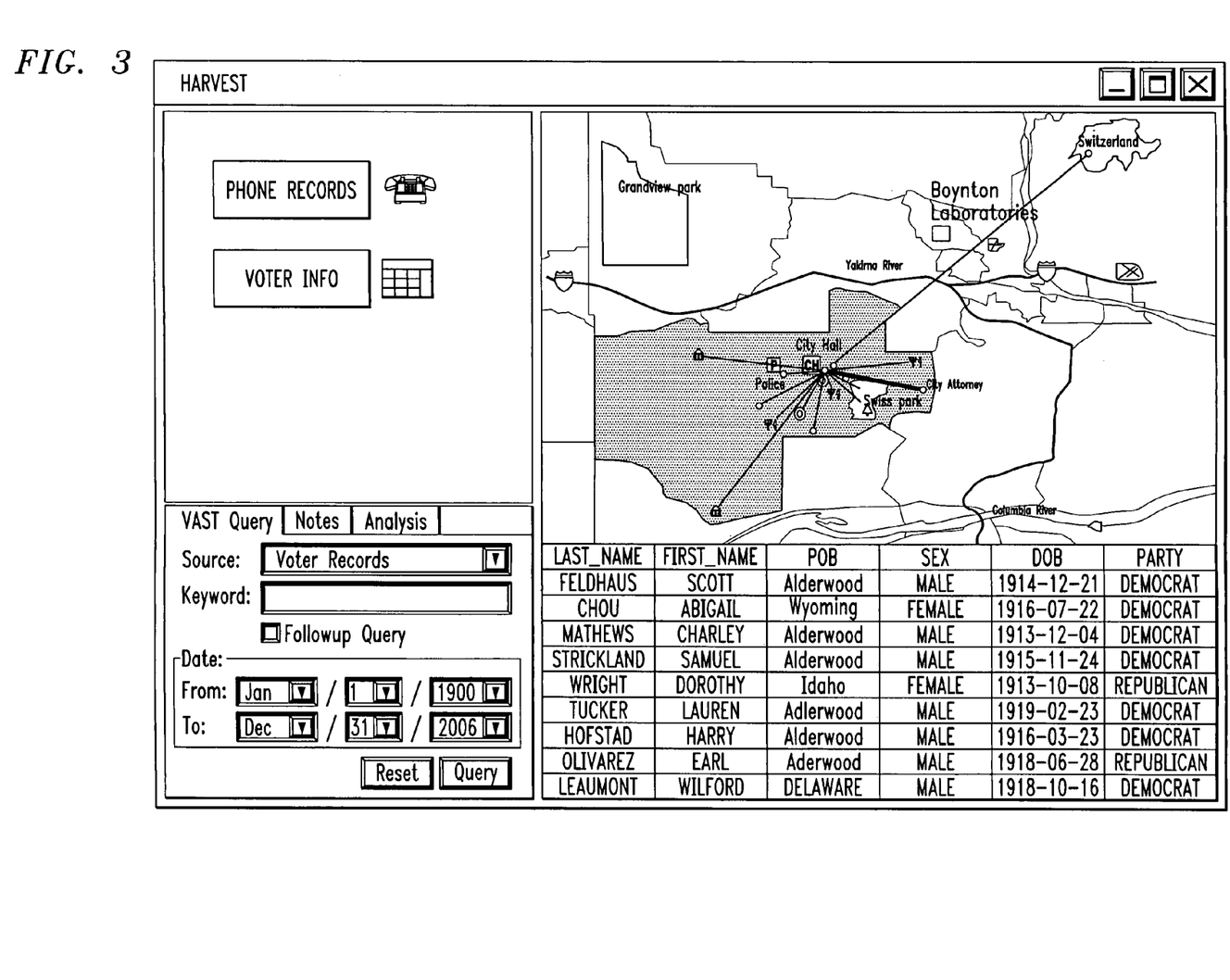
FIG. 3 illustrates an exemplary screenshot of an interface of an analytic system, according to an embodiment of the invention.

Information space 22 is used to visualize and manipulate information relevant to the analytic process. The information displayed in this space is either retrieved at a particular step of investigation or is aggregated from multiple investigative steps. FIG. 1(a) displays the documents retrieved at the step of investigating Rinz, while FIG. 3 combines the phone records retrieved earlier with voter information fetched later in the process (i.e., displays information accumulated from two steps). A user can interact with the information space to manipulate the view of desired information (e.g., viewing the phone records spatially), and mark specific information as new analytic knowledge (e.g., marking Rinz as a potential suspect).

Query space 23 allows a user to input her information requests using a form-based graphical user interface (GUI), keywords, or natural language. Since the analytic system supports heterogeneous data sources, it also allows users to specify desired data sources (e.g., phone record database).

Figure 4:
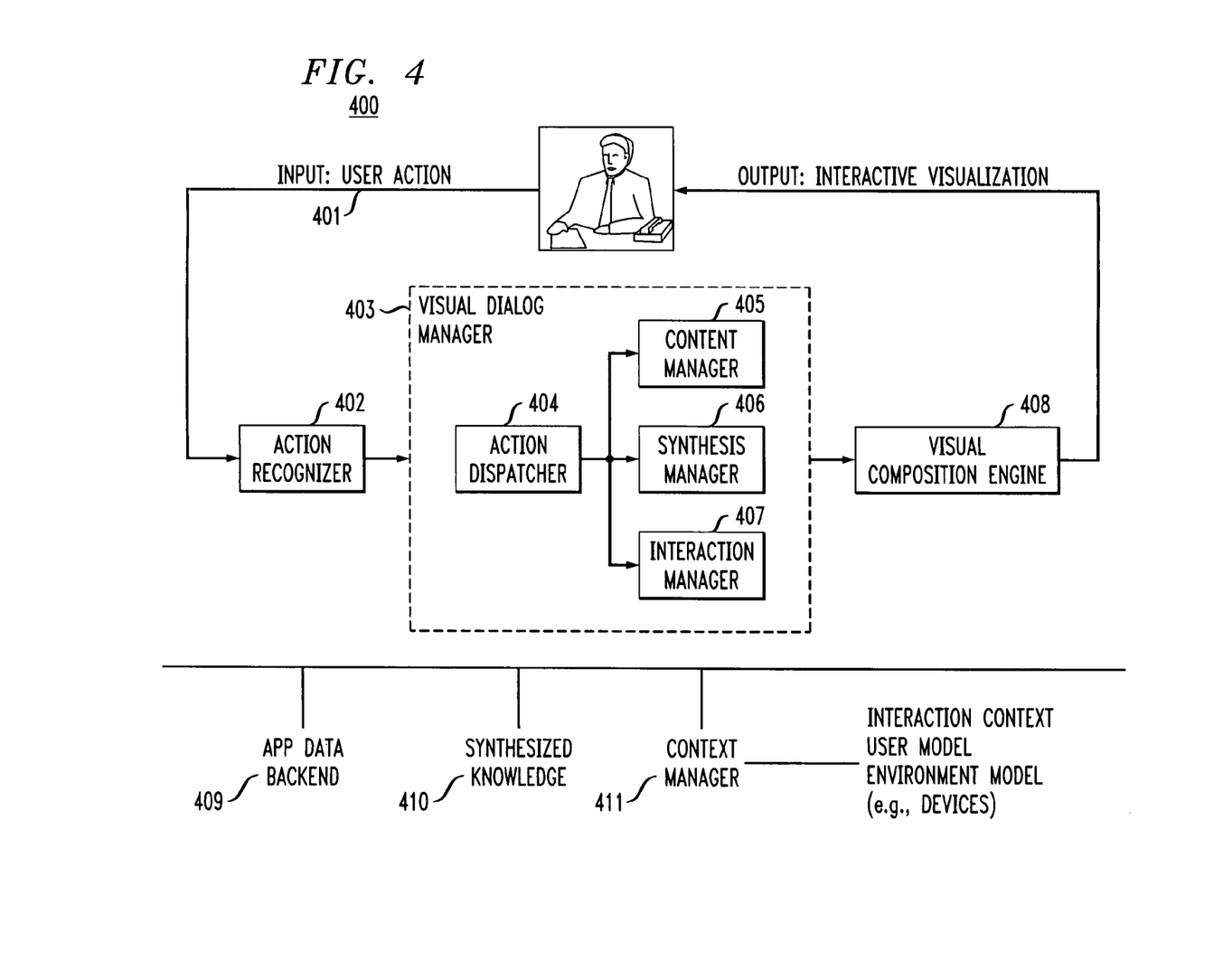
FIG. 4 illustrates an exemplary architecture of an analytic system, according to an embodiment of the invention.

An overview of an illustrative architecture 400 of the analytic system is presented in FIG. 4. As shown, the interactive analysis starts with user action 401. The analytic system 400 employs action recognizer 402 to identify the type of a user action and action parameters. In one illustrative embodiment, the analytic system supports three types of user actions: data inquiry (e.g., searching for specific phone records), data synthesis (e.g., defining a suspect), and visual manipulation (e.g., highlighting phrases in a retrieved document). Each type of action is associated with a set of parameters. For example, a data inquiry action has parameters, such as data content (e.g., searching for "Rinz") and data source (e.g., CNN news).

The recognized action is then sent to visual dialog manager 403, which dynamically decides a course of corresponding actions. Based on the type of the user action, action dispatcher 404 assigns the action to an action manager.

Specifically, content manager 405 handles data inquiry actions by dynamically selecting information relevant to the user context. Synthesis manager 406 supports user data synthesis by automatically maintaining the evolving collection of newly derived user knowledge (e.g., a suspect identified in an investigation) and the corresponding evidence. Interaction manager 407 responds to various user visual manipulations (e.g., changing the view of the displayed information). The interaction manager also handles exceptions (e.g., the desired information is not found) by suggesting follow-on user actions (e.g., modifying search criteria).

Based on the decisions of dialog manager 403, visual composition engine 408 then synthesizes an interactive visual presentation automatically. Such a presentation is used to convey the data inquiry results, illustrate the synthesized knowledge with its evidence, or reflect the results of a user visual manipulation.

Analytic system 400 is connected to an application data backend 409 (e.g., DB2 or text search engines). It also maintains a database 410 holding user-derived knowledge, and uses context manager 411 to manage a user's interaction context, including users' interests/preferences and environment settings (e.g., device capabilities).

We now present a set of realistic examples to illustrate how a user works with the analytic system to dynamically build her analytic context as an investigation develops. We also show how the analytic system uses such context to help the user find relevant information. Our main scenario is on the investigation of the alleged political fraud mentioned above. We are using the IEEE VAST 2006 contest data, including phone records, voter registry, and local news reports.

We first describe the step of interactively building a user's analytic context. Using the analytic system, an analyst can start an investigation either top down (formulating an investigative model first before gathering information) or bottom up (collecting as much information as possible before developing a model). Assume that analyst Mia initially knows little about the alleged fraud and adopts a bottom-up approach. To help Mia organize her bottom-up actions, the analytic system automatically logs her data inquiries as analytic actions and displays the actions in the analytic space. In addition to user data inquiries, the analytic system also automatically records both implicit and explicit user information interactions (e.g., click through and phrase selection).

By default, the analytic system considers subsequent user actions are sub-actions of their predecessors (e.g., investigating "Boynton" is a sub-action of investigating "high-tech company"). However, users can modify such relationships. For example, initially Mia separates the "land grab" investigation from the "Boynton" investigation (screenshot of FIG. 1(a)). Later she connects the two actions in hope of discovering their linkages (screenshot of FIG. 5). Moreover, the developed context helps Mia to formulate future investigative plans. For example, after reading the reports on Boynton, Mia may decide to investigate various Boynton personnel, including the lab director, chief scientists, and spokeswoman (screenshot of FIG. 6).

As the investigation unfolds, the analytic system helps a user to dynamically build her own analytic context, supporting both bottom-up and top-down investigations. In a bottom-up investigation, the analytic system automatically records user actions to minimize user effort. On the other hand, analytic system also allows a user to directly specify an investigative plan (e.g., the plan for investigating Boynton personnel), facilitating a top-down investigation.

We next describe the step of context-aware, adaptive information selection. A user's analytic context reflects the user's information needs. The analytic system thus adapts its information selection to the evolving user context. We use a set of examples to show how an analytic context impacts information selection.

Figure 7:
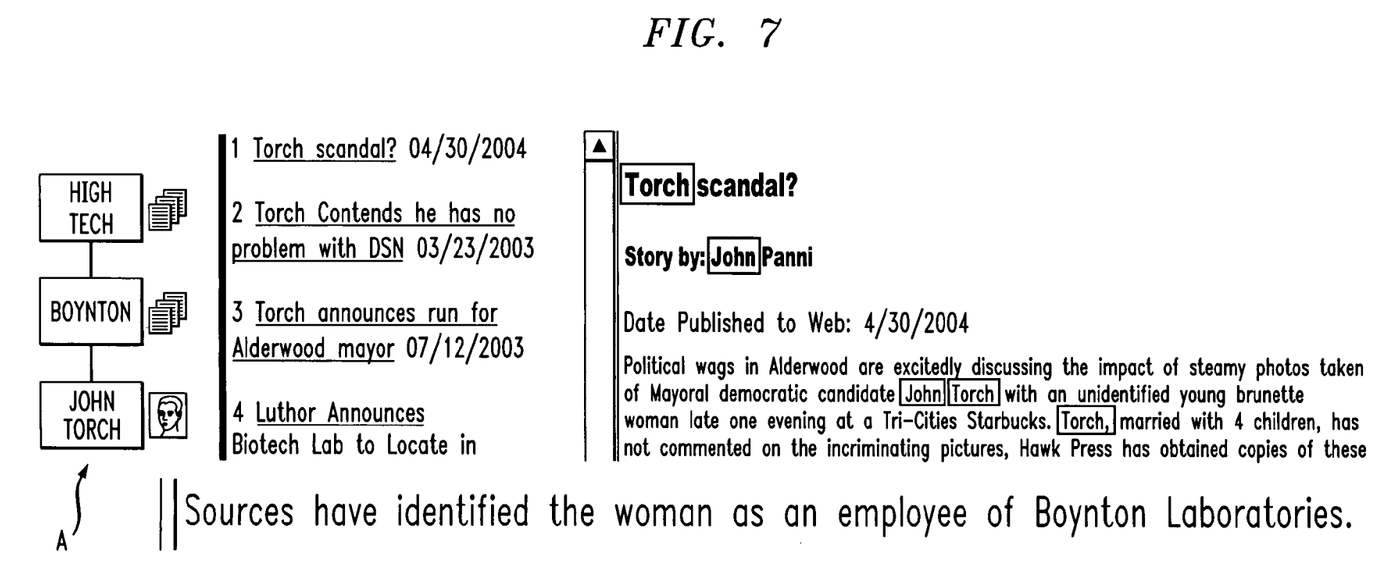
FIG. 7 illustrates an exemplary screenshot of an interface of an analytic system, according to an embodiment of the invention.

A user's analytic context captures user actions, as well as the relationships among the actions. Over the course of an investigation, such relationships may change (e.g., a user may link two originally separate actions together). Different types of relationships imply different information needs. For example, Mia learns that John Torch, a city councilman, is accused of having an affair with a Boynton employee. To uncover more ties between Torch and Boynton, Mia formulates the Torch investigation as a sub-action of the Boynton investigation (screenshot of FIG. 7). As a result, instead of retrieving all information on Torch, the analytic system selects information on Torch that is also related to Boynton (FIG. 7).

Figure 6:
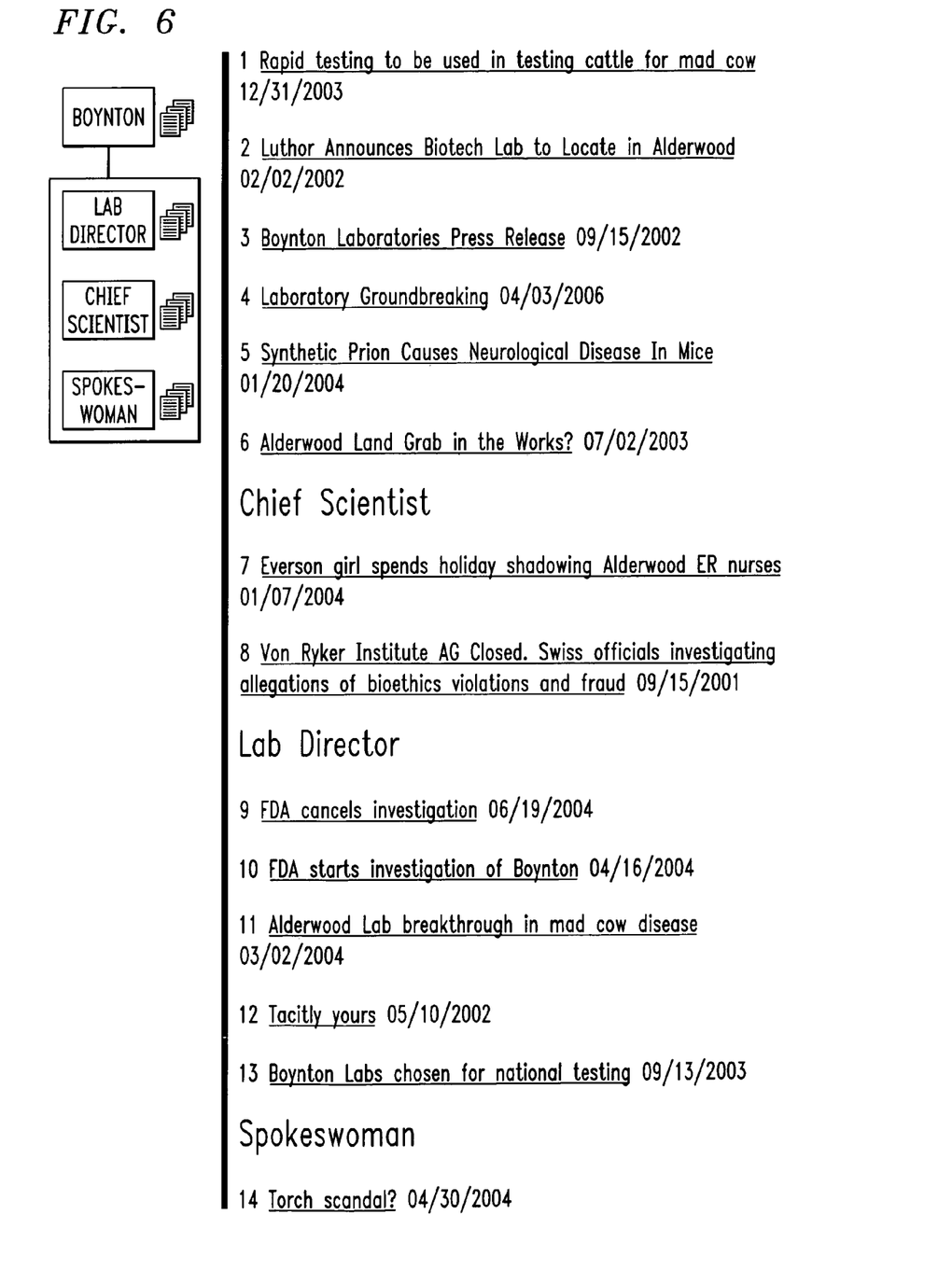
FIG. 6 illustrates an exemplary screenshot of an interface of an analytic system, according to an embodiment of the invention.

In addition to finding information that intersects related analytic actions (e.g., Torch and Boynton), users may be interested in information that is a union of related actions. As illustrated in FIG. 6, Mia inquires about Boynton in the context of its personnel. This structure implies that Mia desires a union of information that is related to one or more types of Boynton personnel. In this case, we cannot simply put all relevant terms together (e.g., "Boynton lab director chief scientist spokesperson"), since such a concatenation may result in nothing, or the results may reflect undesired groupings (e.g., "director chief"). Instead, the analytic system automatically formulates multiple queries to search for each type of personnel ("Boynton lab director" and "Boynton chief scientist"), and then combines the corresponding results together (FIG. 6).

Figure 5:
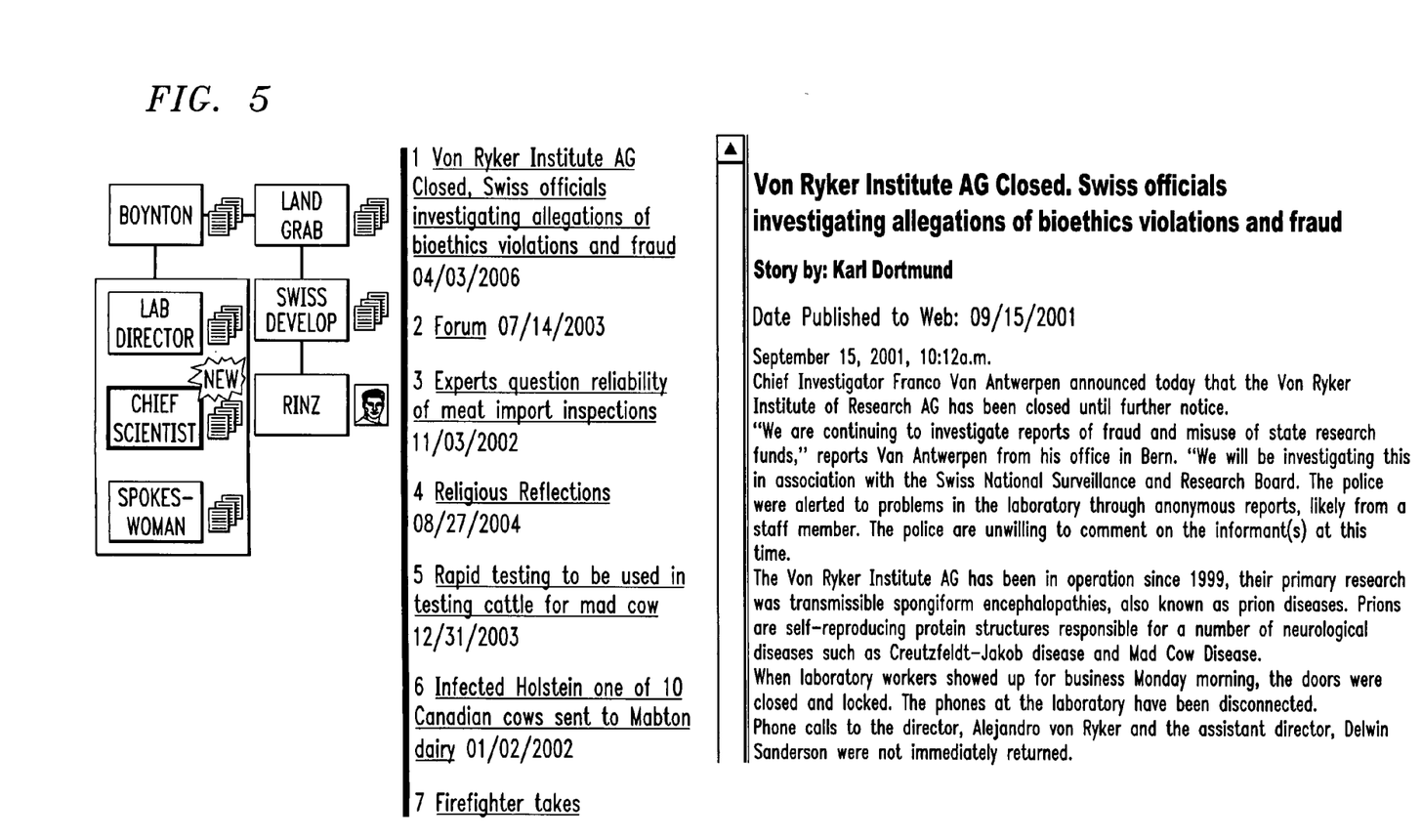
FIG. 5 illustrates an exemplary screenshot of an interface of an analytic system, according to an embodiment of the invention.

During an investigation, users may modify the existing analytic structure. The changed analytic structure impacts information selection. For example, based on her ongoing investigation, Mia would like to discover the connections between two separate analytic threads: "Boynton" and "land grab." Once she links these two threads, the analytic system automatically evaluates previously retrieved information for all actions in both threads. As shown in FIG. 5, the analytic system notifies Mia of the newly surfaced information on the lab's chief scientists, who are identified as being Swiss. In this case, if the analytic system just used "Boynton" and "land grab" in its query, it would not be able to find the desired information. This is because the linkage between the two actions may be indirect (e.g., via the connection between the Swiss developer and the chief scientists). Leveraging the entire analytic structure, the analytic system is then able to promote both directly and indirectly related information.

Figure 8:
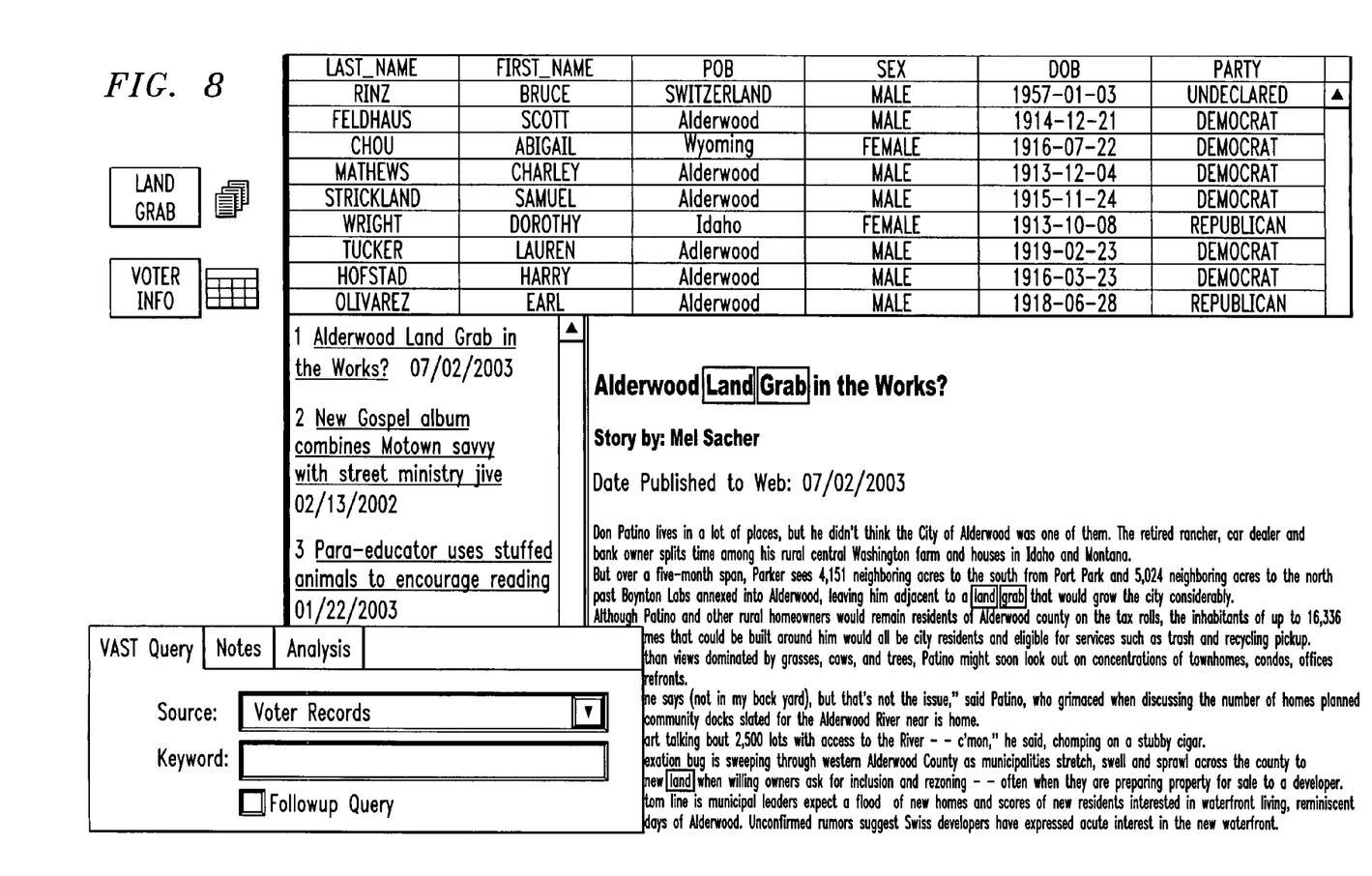
FIG. 8 illustrates an exemplary screenshot of an interface of an analytic system, according to an embodiment of the invention.

User's explicit interactions, such as selecting a keyword or phrase in a retrieved document, may not directly change the analytic structure shown in the analytic space, but may signal user's information interests. Thus, such interactions influence information selection. For example, Mia discovers that an alleged land grab scandal may involve Swiss developers, and she highlights the term "Swiss developers" (screenshot of FIG. 8). To find out who may have ties with Switzerland, Mia queries the voter registry, which contains several types of information, such as the voter's name, birthday, and birth place. Based on Mia's previous interaction, the analytic system automatically promotes voters whose birth places match with "Swiss," even though Mia does not explicitly specify such desires in her query (FIG. 8).

In this case, Mia relies on the analytic system to track her evolving information interests. This is especially valuable in a lengthy investigation, in which a user may not be able to recall every clue and incorporate it to articulate her precise information needs. Based on explicit user interactions, the analytic system can also alert users to re-examine previously retrieved information. For example, as Mia highlights "Swiss developers" and "city attorney" during her investigation, the analytic system automatically evaluates phone calls retrieved earlier and notifies Mia to re-examine relevant calls the calls from city hall to Switzerland and the city attorney (FIG. 1(b)).

In addition to explicit user interactions, implicit user interactions (e.g., user click through) captured in an analytic context may also impact subsequent information selection. For example, when investigating Boynton, Mia may click on the news reports regarding the Food and Drug Administration (FDA) investigation on the company. The analytic system automatically incorporates prominent terms appearing in the document (e.g., "FDA investigation" in the title) as the context for future information selection. As a result, the analytic system can automatically promote information related to these terms without requiring that users explicitly update their information interests.

As described above, a user's analytic context reflects the user's changing information needs. To aid users in finding information relevant to their context, we develop an adaptive, context-aware approach to information selection. We explain our approach in three steps. We first describe a graph-based representation that models a user's analytic context, including the structure of user actions and the relationships among the actions. Using our graph-based representation, we then define a vector-based metric to measure the relevance of information to a user context. Finally, we present an adaptive algorithm that dynamically selects information based on the user context.

Figure 9:
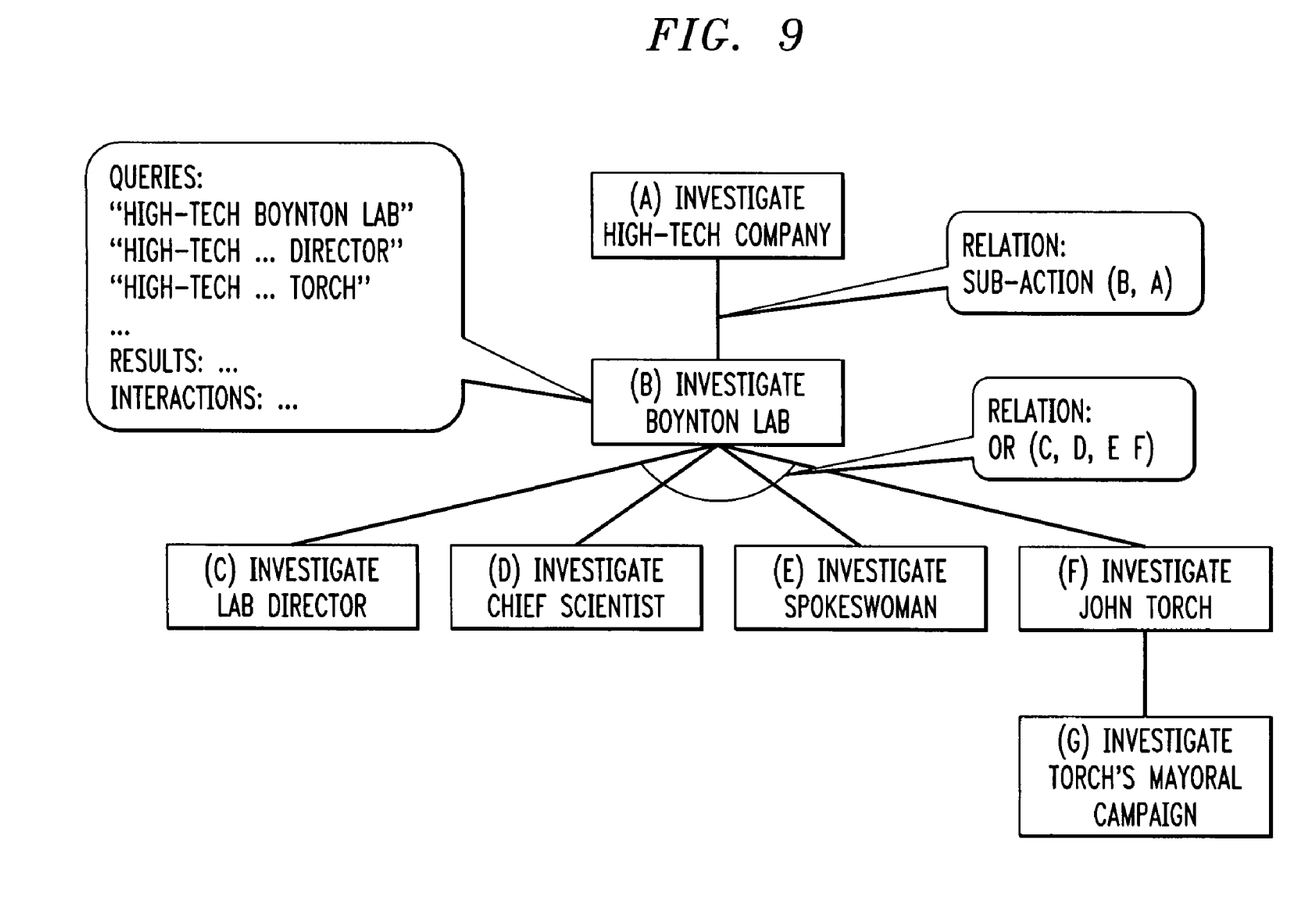
FIG. 9 illustrates an exemplary action graph of an analytic system, according to an embodiment of the invention.

We use an action graph to record user analytic actions and their relationships. FIG. 9 shows an example of an action graph describing our political fraud investigation. An action graph consists of a set of nodes and links. The analytic system visualizes such a graph in its analytic space (FIG. 2).

Each node (A through G in FIG. 9) in an action graph represents a user action. Since we here focus on information selection, we simplify each node to encode a user's investigative target (e.g., nodes "Boynton" and "John Torch" shown in FIG. 7). An action may be automatically created by the analytic system to log a user data request or manually defined by a user to express his investigative targets. For example, the actions in FIG. 7, such as nodes "Boynton" and "John Torch," are automatically created by the analytic system to log a user's queries. In contrast, all the actions in FIG. 6, including nodes "chief scientist" and "spokeswoman," are created by a user. Attached with each node, the systems also records the data queries, query results, and user interaction results (e.g., selected keywords). As shown in FIG. 9, there are multiple queries used for node B. Depending on the context, these queries may be directly entered by a user, or automatically formulated by the analytic system.

Each link in an action graph denotes the relationship between two actions. In FIG. 9, node B is a SUB-ACTION of node A; and there is an OR relation among nodes C, D, E, and F. The analytic system supports several types of logical relationships, including logical AND and OR (see Table 1 below). We selectively support these relationships for two reasons. First, these relationships are easy for users to grasp so that the users can use these relations to express their information needs. Second, the analytic system can effectively utilize these relationships to improve information selection. In FIG. 6, there is an OR relation among all the personnel investigative actions. Based on this relation, the analytic system automatically formulates multiple corresponding queries (e.g., node B in FIG. 9) to find the desired information. A DEFAULT relation is also provided, in case a user is uncertain of the exact relationship between two actions but still would like to relate them. As will be seen below, different relations have different impact on information selection.

Table 1 lists information captured in each node and a set of relationships supported by the analytic system.

TABLE 1

| Node | |
|---|---|
| queries | queries specified (e.g., keyword search terms) |
| Results | retrieved information for each query |
| Implicit Interactions | user clickthrough results |
| Explicit Interactions | user marking results, such as highlighted keywords and marked evidence. |

| Link (Types of Relation) | |
|---|---|
| SUB-ACTION | information needs of one node is a subset of another node |
| AND | intersection of both nodes' information needs is desired |
| OR | union of nodes' information needs is desired |
| XOR | nodes' information needs are conflicting |
| DEFAULT | default relation if users don't specify type |

We now discuss the graph-based representation of analytic actions.

Given a user's information request, an information retrieval engine can be modeled using a function F to find the desired information I:

$I = F(M_1, \ldots, M_k)$, where $M_i$, i=1, ... K, are metrics ranking the relevance of information based on various factors, such as user-specified query terms and underlying document linkages.

Based on this model, we define a context relevance metric, which ranks the relevance of information to a user's analytic context. Specifically, we define our metric in a vector space model. Such a model measures the similarity between a query vector and a document vector. The query vector contains a set of query terms, each of which is assigned a weight, indicating the importance of the term. Each term is typically a word or a phrase. Likewise, the document vector contains a set of terms appearing in a document and each term is also associated with a weight.

Using the vector space model, the terms and their weights in the query vector can be adjusted to influence information selection. In particular, the analytic system dynamically determines these terms and adjusts their weights to find information that is relevant to a user's analytic context. To do so, we compute a context vector for each node in an action graph. A context vector contains a set of terms (i.e., words or phrases) and their respective weights, expressing the information needs for a specific node. In our approach, we use a context vector to select relevant information, as well as to re-rank the retrieved information. For example, the context vector computed for node "Rinz" (FIG. 1(a)) includes terms such as "Boynton" and "Rinz." These terms will first be used to retrieve the desired information on Rinz. As the investigation develops, it may also be used to evaluate the previously retrieved information on Rinz.

Initially, each context vector is empty or contains only user specified query terms. For example, when analyst Mia enters "high-tech" in her first query, the context vector created for this action records the term "high-tech." As the investigation develops, the analytic system automatically updates each context vector based on user actions (e.g., highlighting interested keywords or modifying the action graph structure). In one embodiment, the analytic system updates both the terms and their weights in a context vector from three factors: implicit user interactions, explicit user interactions, and the modified structure of the action graph. Specifically, we define the weight p(t) of term t in a context vector to be a weighted sum of the results derived from the three factors:

$p(t) = w_q \cdot M(t) + w_u \cdot X(t) + w_s \cdot S(t)$ where M(t), X(t) and S(t) denote the weights computed from implicit user interactions, explicit user interactions, and the action graph structure, respectively. In one embodiment, we use equal weights $w_q = w_u = w_s = 0.33$ to combine them.

Implicit user interactions, such as clicking on a retrieved document, imply user's information interests. In one embodiment, we consider only user click through actions. Given such a user action, the system automatically extracts prominent terms appearing in the clicked document (e.g., terms in the document title or section titles). The system adds the extracted terms to the context vector. The system also updates the weight of each term t to capture its relevance to the extracted terms:

$$M(t) = \frac{\sum_k c(t, C_k)}{\sum_k |C_k|}$$

Here $C_k$ contains all the terms extracted in the k-th click through, function c( ) computes the frequency of term t appearing in $C_k$. Here, M(t) would be 0.0 if term t does not appear in $C_k$.

Similarly, the analytic system automatically extracts terms captured from explicit user interactions, such as user-highlighted words and phrases, and adds them to the context vector. However, unlike implicit user interactions, which only impact the analytic action in focus (e.g., node A shown in FIG. 7), explicit user interactions affect all context vectors. This is because we consider explicit user actions better indicators of user information interests. Again, the system updates the weight of term t by computing how it is relevant to the user interaction results:

$$X(t) = \frac{\alpha \sum_j c(t, H_j) + \beta \sum_k c(t, E_k)}{\alpha \sum_j H_j + \beta \sum_k E_k + 1}$$

Here $H_j$ consists of user-highlighted terms, $E_k$ includes terms in a document that is marked by the user as evidence, and $\alpha$, $\beta$ are the confidence factors. Initially, we set these values to be $\alpha=0.4$ and $\beta=0.5$. Again, function c( ) computes the frequency of term t appearing in user-selected terms.

During an investigation, users may modify the structure of an action graph. For example, the user connects the two nodes "Boynton" and "land grab" in FIG. 5. In such cases, the analytic system must also update the context vectors for all affected nodes. For each node $s_j$ that is related to $s_i$, the system computes a weight $\Phi(i, j)$ to indicate the influence of $s_j$ on $s_i$. Specifically, we compute the strength of such influence based on the type of relation that exists between $s_j$ and $s_i$. Based on this notion, we then define the overall structural influence S(t) on term t. The overall influence is a weighted sum of the influences produced by all related nodes:

$$S(t) = \frac{1}{N_r} \sum_{j=1}^{N_r} \Phi(i, j) \cdot p_j(t)$$

where $N_r$ is the total number of related nodes to $s_i$, $p_j(t)$ is the weight for term t in node $s_j$. $\Phi(i, j)$ measures the strength of influence between two related nodes, as defined in Table 2.

TABLE 2

| | Relation | | | | |
|---|---|---|---|---|---|
| | SUB-ACTION | AND | OR | XOR | DEFAULT |
| Strength | 0.5 | 0.6 | 0.1 | 0.1 | 0.2 |

Currently, SUB-ACTION (0.5) and AND (0.6) are assigned higher strength of influence, since such relations require the analytic system to select information that is related to all the neighboring nodes. In contrast, relations OR (0.1) and XOR (0.1) have less influence on the neighboring nodes, since it does not require the system to find the intersected information. So far, we have set these values based on our empirical experiments.

We could also directly use Boolean operators provided by existing search engines to directly express the relationships between the queries specified in each node. However, we choose not to do so for a reason. Typically, the Boolean operators express the logical relationships among different query terms, which are only an approximation of user information interests. In contrast, system-supplied action relationships describe the relationships among user analytic actions at a higher level. In practice, such higher-level relationships may not be directly translated into Boolean constraints among query terms. For example, in FIG. 7, if the system simply uses an AND Boolean operator to combine terms "High-tech," "Boynton," and "John Torch" together, the underlying search engine may return nothing if there is no document contains all the terms.

Figure 10:
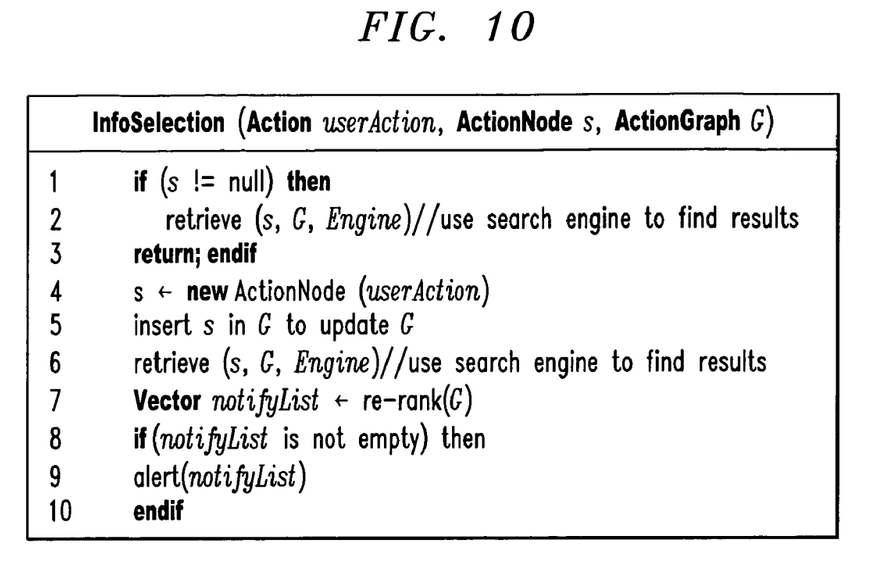
FIG. 10 illustrates an exemplary information selection algorithm, according to an embodiment of the invention.

FIG. 10 outlines an adaptive algorithm that uses the analytic context captured in action graph G to select the relevant information for an given node s. Depending on the input value of s, the algorithm handles two different situations. If s is specified, it implies that a user is re-evaluating the information retrieved for s. In this case, the analytic system simply re-submits the queries to the search engine with the current information on s and G (line 2).

If s is null, it implies that the user is initiating a new analytic action s (lines 4-10). For example, when a user enters "John Torch" first time in the query panel, a new node is created. The analytic system creates the new node s using the parameters specified in the user action (e.g., data constraints and data sources). The new node is also inserted into G (line 5). The underlying search engine then retrieves the desired information for node s in G (line 6). Since the action graph has been updated with a new node, the algorithm automatically re-ranks all previously retrieved information in the light of the new context (line 7). If the re-ranking produces new results, the analytic system alerts the user of such changes (lines 8-9). For example, an icon would be added next to the node to indicate the update (e.g., node "Phone Records" in FIG. 1(b)).

Next we explain how the two procedures retrieve( ) and rerank( ) outlined in the algorithm select the relevant information and re-rank the existing information, respectively.

As an example pervasive, context-aware application, consider an application that adjusts a homeowner's thermostat to a comfortable temperature upon detecting that the homeowner is driving home from work. Such an application would use context about a human user such as the location of the user's automobile to infer whether or not the user is approaching their home. Based on the inference, the application sets the appropriate temperature in the home's ventilation system. The design of such a system is very user dependent. A user that works close to his home would require an application design that is very different from a user that has a long work commute. Likewise, a user that takes care of several errands near her home just after work would require a design that is different from a user who takes care of errands in the morning prior to work.

When retrieving the desired information for node s in graph G, the analytic system examines the context vector computed for node s. In particular, it uses the context vector to augment the query. This operation is known as query expansion. In one embodiment, we augment keyword-based user queries for unstructured information. For example, in FIG. 7, the user enters "John Torch." Since "John Torch" is defined as a SUB-ACTION of "Boynton," the context vector for node "John Torch" contains term "Boynton" with a weight of 0.5. The original query thus is expanded to include both "John Torch" and "Boynton," where their weights are 1.0 and 0.5, respectively. The augmented query is then submitted to the underlying search engine. In our case, the weights of the terms are also used as boost factors for ranking the retrieved documents. For example, using the above weights for "John Torch" and "Boynton," documents containing just "John Torch" will be ranked higher than documents containing only "Boynton."

Although query expansion helps to retrieve relevant information, it is inefficient to re-submit expanded queries whenever the context changes. This is especially true when dealing with large data sets. Thus, we use a re-ranking approach to quickly re-evaluate previously retrieved information in an updated context. For example, the user highlights "Swiss Developers" appearing in the land grab report (FIG. 1(b)). As described above, based on this user interaction, the analytic system incorporates the term "Swiss developer" into every context vector. It then traverses each node in the graph and uses the updated context vector to re-rank the previously retrieved information for the node. In the above example, the analytic system would promote retrieved news reports that match "Swiss." It would also promote retrieved database records (e.g., phone call records), if any of their column values match "Swiss." Instead of performing a strict string match, the analytic system matches the terms by their morphological forms (e.g., Swiss is a morph of Switzerland).

To compute the new rank of a piece of retrieved information, we use a modified BM25 (see, e.g., J. Teevan, S. G. Dumais and E. Horvitz, "Personalizing search via automated analysis of interests and activities," In SIGIR 2005, pp. 449-456, 2005, the disclosure of which is incorporated by reference herein). Based on this model, we compute the relevance of a document to a context vector by two criteria: (1) the frequency of the terms (e.g., "Swiss" in the above example) appearing in the document; and (2) the importance of such terms (e.g., generic terms like "the" are considered less important). Given a context vector, let t be a term in the vector, p(t) be its weight, w(t) be the term importance, and tf(t) be the term frequency of t appearing in a document to be re-ranked. The relevance score of this document is then:

$$\text{score} = \sum_t p(t) \cdot w(t) \cdot tf(t) \qquad \text{Formula 1}$$

Depending on the context, the re-ranking may produce a new ordering of documents that is not significantly different from the previous ordering. To measure whether the re-ranking is significant enough to alert the user, we compute a Discounted Cumulative Gain (DCG) before and after the re-ranking. DCG computes the information gain for each set of ranked documents. In our case, the information gain is the score produced by Formula 1. If the computed DCG difference exceeds a certain threshold, the analytic system will consider the re-ranking significant and alert the user. In one embodiment, the threshold is 0.2.

Figure 11:
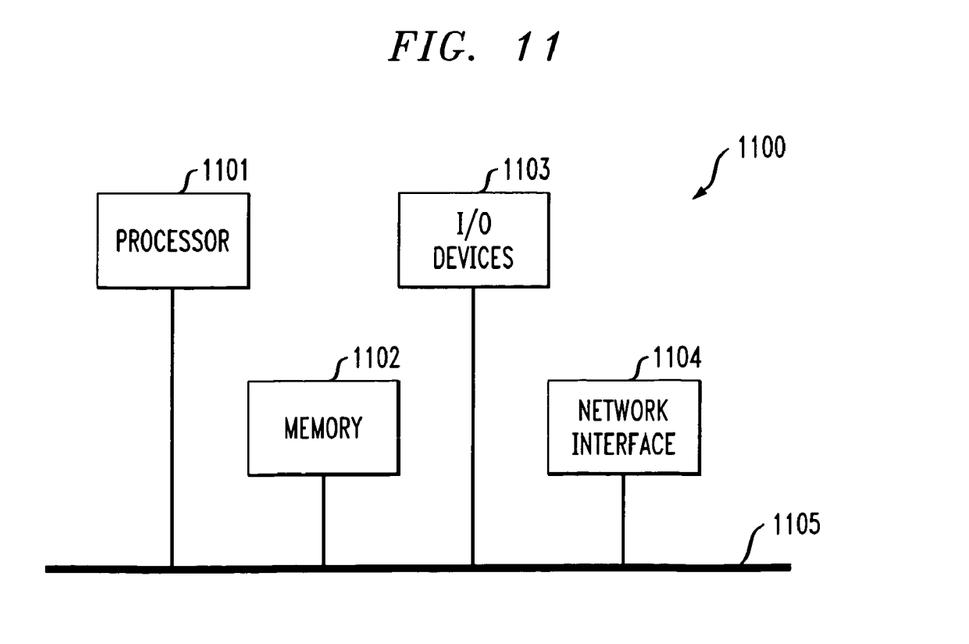
FIG. 11 illustrates a computer system in accordance with which one or more components/steps of an analytic system may be implemented, according to an embodiment of the invention.

FIG. 11 illustrates a computer system in accordance with which one or more components/steps of an analytic system (e.g., components/steps described in the context of FIGS. 1 and 10) may be implemented, according to an embodiment of the present invention.

Further, it is to be understood that the individual components/steps may be implemented on one such computer system, or more preferably, on more than one such computer system. In the case of an implementation on a distributed system, the individual computer systems and/or devices may be connected via a suitable network (e.g., the Internet or World Wide Web). However, the system may be realized via private or local networks. The invention is not limited to any particular network.

As shown, the computer system 1100 may be implemented in accordance with a processor 1101, a memory 1102, I/O devices 1103, and a network interface 1104, coupled via a computer bus 1105 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method of automatically assisting an analyst in a current information analysis task, comprising the steps of:

modeling an analytic context, in a user-system cooperative manner, wherein the analytic context is a structure representative of user analytic actions and relationships associated therewith; and utilizing at least a portion of the user-system cooperatively-modeled analytic context structure to adaptively gather information relevant to a current information analysis task;

wherein the step of user-system cooperative modeling of an analytic context further comprises modeling the analytic context as a graph of user analytic actions, wherein the step of modeling the analytic context as a graph of user analytic actions further comprises the step of modeling a user analytic action for a particular investigative target as a node of the analytic action graph, wherein the step of modeling a user analytic action for a particular investigative target as a node of the analytic action graph further comprises the step of persisting user queries on investigative targets, gathered information and interactions with the results related to information gathering;

wherein the step of modeling the analytic context as a graph of user analytic actions further comprises the step of cooperatively modeling the relationships of user analytic actions in accordance with the graph, wherein the step of cooperatively modeling the relationships of user analytic actions further comprises the step of modeling logical relationships between user analytic actions in accordance with the graph, wherein the step of cooperatively modeling the relationships of user analytic actions further comprises the step of modeling relationships between user analytic actions beyond logical relationships via user annotations in accordance with the graph;

wherein the step of modeling the analytic context as a graph of user analytic actions further comprises generating a user interface that allows the analyst to one of view and modify the analytic action graph during analysis;

wherein the step of adaptively gathering information relevant to a current information analysis task further comprises the step of adaptive information selection based on evolving analytic context persisted in the analytic action graph, wherein the step of adaptive information selection based on evolving analytic context persisted in the analytic action graph further comprises the step of evaluating information relevance using a context vector that is extracted from the analytic action graph to represent contextual information of interests for each analytic action, wherein the step of adaptive information selection based on evolving analytic context persisted in the analytic action graph further comprises the step of re-ranking previously persisted information in the analytic action graph when the analytic context evolves so as to identify previous information relevant to current analysis in non-linear investigation, wherein the step of re-ranking previously persisted information further comprises the step of assessing the re-ranking quality and sending appropriate notifications based on the re-ranking quality, wherein the step of adaptive information selection based on evolving analytic context persisted in the analytic action graph further comprises permitting an observer to assess the analytic context for information gathering based on the analytic action graph, wherein the step of adaptive information selection based on evolving analytic context persisted in the analytic action graph further comprises permitting the observer to recommend one or more changes to the analytic action graph to improve information gathering;

wherein the observer comprises the analyst or a computer program.

* * * * *